Figure 1:
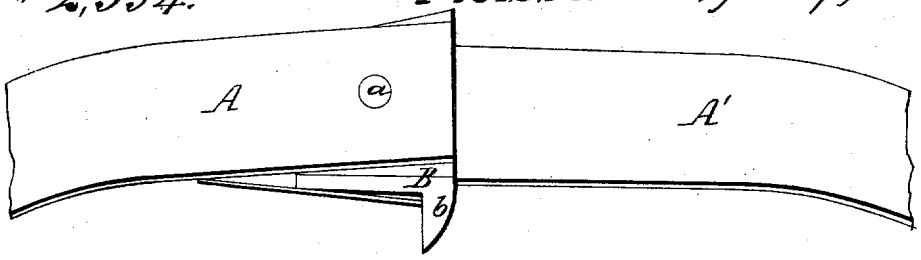

J. F. Milligan.

Sheet 1, 2 Sheets.

Cotton Bale Tie.

No. 2,554. Reissued Apr. 9, 1867.

Witnesses.
Henry Wm Kraatz.
M Randolph.

Inventor.
John F Milligan.

N. PETERS, PHOTO-LITHOGRAPHER, WASHINGTON, D. C.

Sheet 2,
2 Sheets.

J. F. Milligan.

Cotton Bale Tie.

No. 2,554. Reissued Apr. 9, 1867.

Witnesses.
Joseph W. Branch
Joseph Crook.

Inventor.
John F. Milligan
By Randolph & Co
Attys.

N. PETERS, PHOTO-LITHOGRAPHER, WASHINGTON, D. C.

UNITED STATES PATENT OFFICE.

JOSEPH W. BRANCH AND JOSEPH CROOKES, OF ST. LOUIS, MISSOURI, ASSIGNEES OF JOHN F. MILLIGAN.

IMPROVEMENT IN COTTON-BALE TIES.

Specification forming part of Letters Patent No. 59,512, dated November 6, 1866; Reissue No. 2,554, dated April 9, 1867.

*To all whom it may concern:*

Be it known that JOHN F. MILLIGAN, of St. Louis, in the county of St. Louis, State of Missouri, has invented certain new and useful improvements in metallic ties or locks of bands or hoops for packages and bales of cotton, hemp, and such like merchandise, for which, under the name of "improvement in cotton-ties" Letters Patent of the United States were issued, dated 6th day of November, A. D. 1866, said Letters Patent being issued to JOSEPH W. BRANCH and JOSEPH CROOKES, of the place aforesaid, as assignees of all the title of said MILLIGAN in and to said invention, as witnessed by an assignment dated on the 12th day of October, 1865, under the hand and seal of said MILLIGAN, duly executed and recorded in the United States Patent Office in Liber T[8], page 359, of transfers of patents, and whereas said Letters Patent are believed to be inoperative by reason of an insufficient description and specification, we, the said JOSEPH W. BRANCH and JOSEPH CROOKES, now declare the following to be a full, clear, and exact description of the principle or character which distinguishes this invention from all other things before known, and of the manner of constructing or arranging and using the same, reference being had to the accompanying drawings, and to the letters of reference marked thereon.

It is well known that such merchandise as hemp, cotton, and rags is, for convenience and economy of handling and storing, usually packed or compressed into bales or packages of a comparatively moderate compass (to its bulk before compression,) and that to confine and retain the material so packed metallic bands are often used, encircling the packages, and that these bands or hoops are usually straight thin strips of metal, such as iron, steel, or copper, the ends whereof are securely held and tied by some device, usually called a "tie" or "lock," said tie or lock enabling the band when around the package to act as an endless band to resist the expansion of the material of the package.

We now declare the said invention to be an improvement in ties or locks for bands or hoops used to confine bales of merchandise, and that the nature of said invention is, first, in the formation of said tie or lock in such manner as to securely connect and fasten the ends of each band, and is, secondly, in the formation of said tie or lock in such manner that the ends of each band may be properly connected so as to adjust the inclosed compass to the circumferential dimensions of the bale or package. The said invention, then, is useful to tie down and hold bales of various sizes, it being adjustable to the compass thereof.

To enable those skilled in the arts to construct, arrange, and use the said improved tie, we will specially describe the detail construction, arrangement, and application, having reference to the accompanying drawings, in which—

Figure 2:
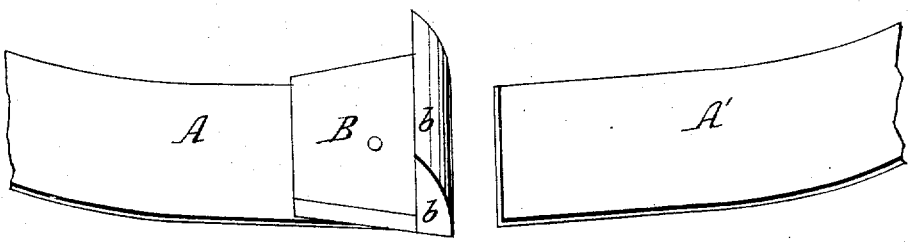
Figure 3:
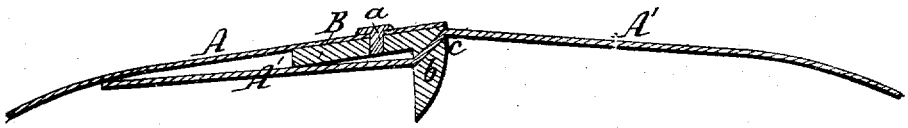
Figure 4:
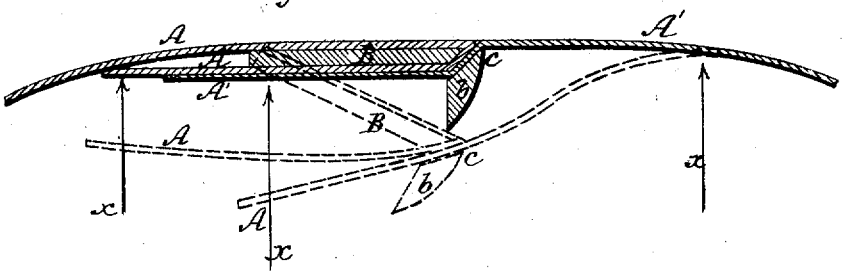

Figure 1 is a perspective view showing the ends of a band or hoop joined by said tie. Fig. 2 is a perspective view showing the ends of a band and the tie-plate reversed, and one end of the band withdrawn from the tie. Fig. 3 is a sectional elevation of the tie when completed. Fig. 4 is a sectional elevation of the tie, illustrating the attachment of the bands without riveting either end to the buckle.

From the drawings now described, it doth appear that it is the nature of said invention, first, that the ends of a band or hoop are joined without cutting holes or slots in said ends, or either of them; that therefore the full strength of the material metal is employed in the tie to resist the great expansive forces of the compressed material, as well as the various concussions, compressions and strains attendant upon the handling and storing or transporting of bales bound around by said bands. It doth, secondly, appear that the nature of said invention is in the application of a tie plate or buckle of peculiar shape, and in the joining of each end of a band separately with said tie plate or buckle; and, lastly, the nature of said invention is in forming the joint or connection of each end of the band with the tie plate or buckle by bending said ends of the band in a proper manner (hereinafter specially described) either by force of hand and by the expansive forces of the compressed material, or solely by the expansive forces of the compressed material, all of which we will now proceed to explain in proper detail.

A and A′ are the ends of the band which are to be connected by the tie plate or buckle B. The bands are usually wrought iron or steel, and the buckle B will be formed of gray or malleable iron, or of wrought-iron or brass. The buckle has a mortise through the forward end thereof, as shown by *c*, Fig. 3, through which it is proposed to pass the ends of the band. Now, either end of the band may be riveted to *d*, as shown in Figs. 1, 2, and 3, if this be deemed advisable; but usually we find it economical to secure both ends A and A′ of the band in the manner following. Before the band is placed around the bale or package we secure one end—say A—to B, by passing said end A through the mortise *a*, and turning the extreme end of A back under this part of the band, as plainly shown in Fig. 4. Suppose, now, the band be placed about the bale, the bale being under the buckled end A of the band, as indicated in Fig. 1. We then pass the end A′ of the band through the mortise *c* of the buckle. To do this easily it may be necessary to slightly incline the buckle toward a position perpendicular to the top surface of the bale. The extreme part of A′ is passed under the "turned-under" part of A, as shown. It will now appear, as by the red lines in Fig. 4, that the position in which the buckle B was placed in the effort to pass A′ through *a*, is such that when the expansive forces of the bale act upon the parts of the band and buckle, the same are fully brought to the position indicated by Fig. 1, the tendency of the expansive forces being to confirm the bends of kinks in the band ends partly made by passing the same through the mortise *c*, said tendency being furthermore to press the extreme ends of A and A′ (which underlie the end A of the band) firmly together and against the overlying part A, as seen in Fig. 1; but especially owing to this tendency to press the extreme ends of A and A′ against the overlying part of A, these extreme ends are securely prevented from withdrawing from the buckle by returning through the mortise thereof. Again, as will be seen by Figs. 1 and 3, the extreme ends of A and A′ being secured under a part of the band, are not liable to be upturned or bent to the injury and damage of the fastening and inconvenience of the laborers in handling. It will now be noticed that there may be other ways of joining the ends A and A′ by said buckle B. For instance, the end A may be passed through the mortise *c*. Thereupon A′ may be passed through, thus the extreme ends of A and A′ being on different sides of the buckle. In this case the buckle will again stand inclined to the top surface of the bale, as shown in red lines in Fig. 3, and the expansive tendencies of the bale will again, in pressing B to a position parallel with the top surface of the bale, bend the ends A and A′ and confirm and secure the tie or connection.

All of the various methods of joining A and A′ with B we fully believe have merit only by the form of the said buckle B.

Having now fully described said invention, what we claim, and desire to now fully secure by these Letters Patent, is—

1. The application of a buckle, B, for the joining of the ends A and A′ of a hoop or band, when the said ends (or either of them) are passed through a mortise, *c*, of said buckle without cutting or otherwise weakening the ends or end so passed, and when the parts thus joined are held by the expansive forces of the compressed bale, substantially as herein fully set forth.

2. The buckle or tie plate B, provided with a projection, *b*, when combined with an oblique slot, *c*, to receive and secure the ends of the bale-hoop, substantially as and for the purpose herein set forth.

In testimony of which invention we hereunto set our hands and seals this 29th day of December, A. D. 1866.

JOSEPH W. BRANCH. [L. S.]
JOSEPH CROOKES. [L. S.]

Witnesses:
GEO. P. HERTHEL, Jr.,
M. RANDOLPH.